United States Patent [19]

Edwards et al.

[11] Patent Number: 4,538,272
[45] Date of Patent: Aug. 27, 1985

[54] PRIORITIZED CLOCK SELECTION CIRCUIT

[75] Inventors: Ivan L. Edwards, West Lafayette, Ind.; Max S. Macrander, Warrenville, Ill.

[73] Assignee: GTE Automatic Electric Incorporated, Northlake, Ill.

[21] Appl. No.: 564,270

[22] Filed: Dec. 22, 1983

[51] Int. Cl.³ .................... G06F 1/04; G06F 11/20; H04Q 3/54
[52] U.S. Cl. .................. 371/61; 179/18 EE; 371/8
[58] Field of Search ............... 371/61, 62, 8; 179/18 EE; 307/269, 441, 442, 219

[56] References Cited

U.S. PATENT DOCUMENTS

| | | | |
|---|---|---|---|
| 3,803,568 | 4/1974 | Higashide | 371/61 X |
| 4,144,448 | 3/1979 | Pisciotta et al. | 371/61 |
| 4,322,580 | 3/1982 | Khan et al. | 179/18 EE |
| 4,490,581 | 12/1984 | Edwards et al. | 179/18 EE |

*Primary Examiner*—Charles E. Atkinson
*Attorney, Agent, or Firm*—Gregory G. Hendricks

[57] ABSTRACT

A clock selection circuit which selects and enables one of a plurality of clock circuits in response to initialization by a processing unit or detection of failure of an on-line clock circuit. The clock circuits are selected on the basis of a priority arrangement. The clock circuit failure is detected by a retriggerable monostable multivibrator and the selection priority is based on time delays generated by programmed counters associated with each clock circuit.

20 Claims, 5 Drawing Figures

PRIORITIZED CLOCK SELECTION CIRCUIT

FIELD OF THE INVENTION

The present invention relates to telephone switching systems and more particularly to a clock selection circuit for use in a telephone switching system having a plurality of clock circuits.

BACKGROUND OF THE INVENTION

Clock selection circuits are old and well known. A recent development in the state of this art was disclosed in U.S. Pat. No. 4,322,580 which issued on Mar. 30, 1982. The clock selection circuit disclosed therein scans a plurality of available clock circuits upon detection of failure of an on-line clock circuit, and places another properly operating clock circuit on-line. One feature of that circuit is that it scans through the various clock circuits in a certain sequence to select the next properly operating clock circuit. However, that circuit may fail to complete its scan and a new clock circuit will not be selected if certain logic gates in the scanning circuitry fail.

The present invention discloses a novel arrangement for selecting a clock circuit and this new arrangement has a greater tolerance to logic gate failures than the arrangement disclosed in the referenced patent.

SUMMARY OF THE INVENTION

In accordance with the present invention, clock selection circuit is provided for use in a switching system which includes a plurality of clock circuits, each being operative to provide a stream of clock pulses. The clock selection circuit comprises a plurality of delay circuits each connected to all but one associated clock circuit and each being operative to provide a time-out signal, and a plurality of clock pulse detection circuits, each connected to the associated clock circuit and operative, in response to an absence of a clock pulse for a predetermined time, to provide a clock failure signal.

It also includes a plurality of storage circuits each connected to a different one of the delay circuits and a different one of the detection circuits, and each being operative in response to the time-out signal from the connected delay circuit to provide a clock enable signal for the associated clock circuit. Each of the storage circuits are further operative in response to the clock failure signal from the connected clock pulse detection circuit to provide a clock disable signal for the associated clock circuit.

Also included is a clock signal gating circuit which is connected to the plurality of clock circuits and the plurality of storage circuits and is operative in response to each of the clock enable signal to gate clock pulses from the associated clock circuit to the switching system. Each of the delay circuits is operative in response to simultaneous presence of the clock disable signal from all of the unassociated clock circuits to provide the time-out signal after a different predetermined time.

DESCRIPTION OF THE PREFERRED EMBODIMENT

Figure 1:
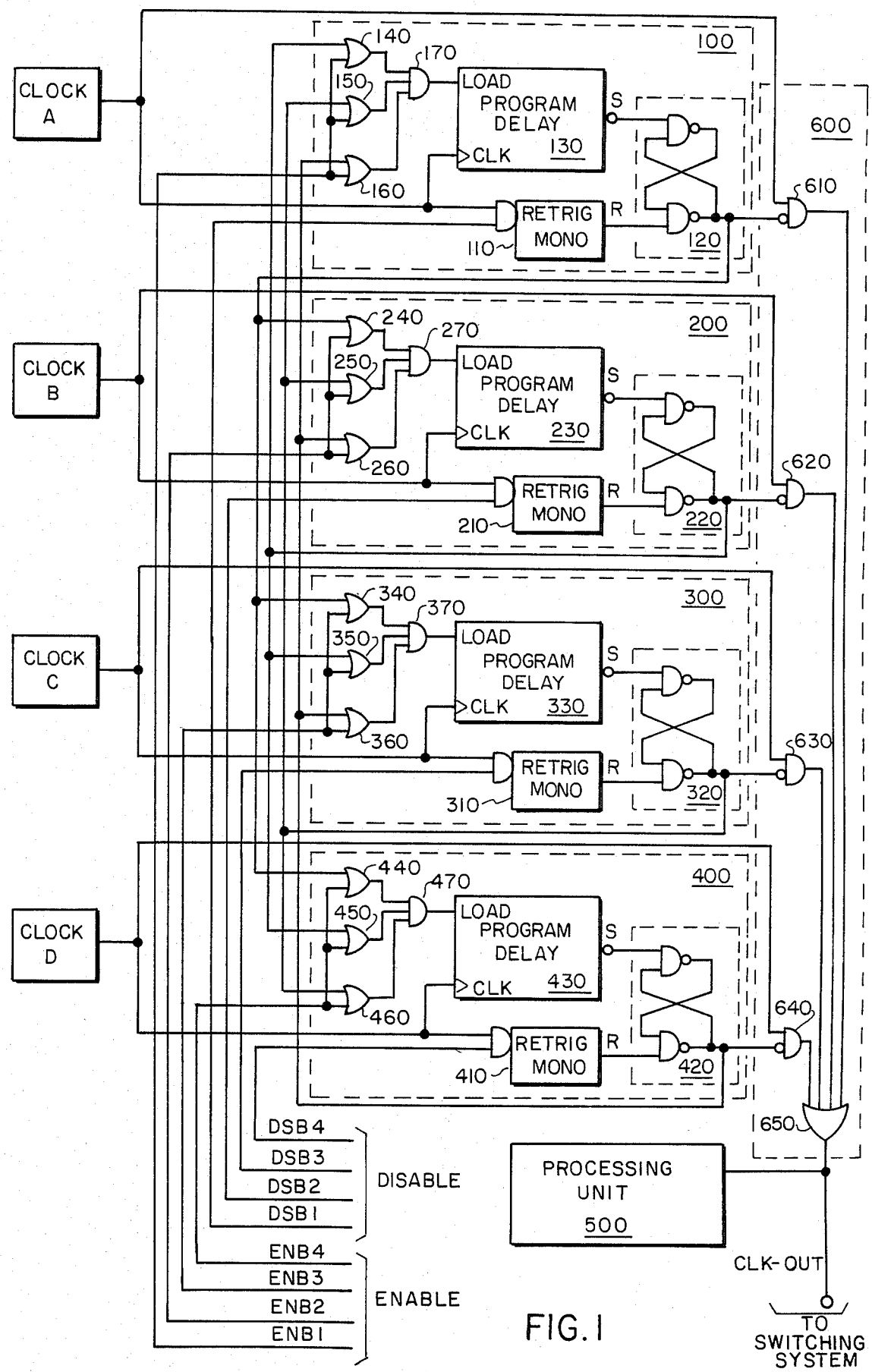
FIG. 1 is a combined block and logic diagram of the prioritized clock selection circuit of the present invention.

Referring now to FIG. 1, the prioritized clock selection circuit of the present invention is shown. Subcircuits 100, 200, 300 and 400 are shown connected to clock circuits A, B, C and D. These subcircuits are further connected to processing unit 500 and to the remainder of an associated telephone switching system via gate circuit 600. Subcircuit 100 includes retriggerable monostable multivibrator 110 connected between clock circuit A and the reset (R) input of latch 120. Another input of the monostable is connected to processing unit 500. Program delay element 130 is connected to the set(s) input of latch 120. The inputs of program delay element 130 are connected to clock A and to the output of AND gate 170. The inputs of AND gate 170 are connected to the outputs of OR gates 140, 150 and 160. One input of each of OR gates 140, 150 and 160 is connected to each other and to processing unit 500. The other input of OR gate 140 is connected to the output of subcircuit 200. The other input of OR gate 150 is connected to the output of subcircuit 300, and the other input of OR gate 160 is connected to the output of subcircuit 400.

The remaining subcircuits are arranged similarily with retriggerable monostable multivibrators, latch circuits, program delay circuits and logic gates.

The outputs of latch circuits 120, 220, 320 and 420 are further connected to AND function gates 610, 620, 630 and 640, respectively in gate circuit 600. These AND gates are also connected to associated clock circuits A, B, C and D, respectively. The outputs of these AND gates are connected to OR gate 650 which provides the clock output (CLK-OUT) signal to processing unit 500 and to the remainder of the associated telephone switching system.

Processing unit 500 includes enable lead ENB1 connected to OR gates 140, 150 and 160; enable lead ENB2 connected to OR gates 240, 250 and 260; enable lead ENB3 connected to OR gates 340, 350 and 360; and enable lead ENB4 connected to OR gates 440, 450 and 460. Processing unit 500 also includes disable leads DSB1-4 connected to retriggerable monostable multivibrators 110, 210, 310 and 410, respectively.

The clock selection circuit of the present invention operates to disable a failed clock circuit, and enable a properly operating standby clock circuit by testing and selecting clock circuits in a priority sequence. The four clock circuits are arranged into copies 1 and 2 with clock circuits A and B in copy 1 and clock circuits C and D in copy 2. The order of priority from highest to lowest is clock circuit A then C then B and then D.

The priority of each clock circuit is determined by the program delay circuit in the associated clock selection subcircuit. The shorter the delay in this circuit, the higher the priority. To establish a priority sequence of A to C to B to D, the program delay circuit in the subcircuit associated with clock A is programmed to have the shortest delay. Increasingly longer programmed delays are successively provided for the program delay circuits in the subcircuits associated with clock circuits C, B and D, respectively.

Processing unit 500 initializes the latches in the clock selection circuit via the ENABLE and $\overline{\text{DISABLE}}$ signals. A typical initialization arrangement would be to enable clock circuit A and disable clock circuits B, C and D. To do this processing unit 500 applies a logic level 1 ENABLE signal to gates 140, 150, 160 and logic level 0 $\overline{\text{DISABLE}}$ signals to multivibrators 210, 310 and 410.

The logic level 1 ENABLE signal appearing at OR gates 140, 150 and 160 causes these gates to apply logic level signals to the inputs of AND gate 170. This gate then applies a logic level 1 signal to program delay circuit 130. This circuit then applies, after its program delay has timed out, a logic level 0 pulse to the set(s) input of latch 120. This causes the latch to set, since the output signal from multivibrator 110 is at a logic level 1. This latch then provides a logic level 0 signal at its output. This logic level 0 signal is then applied to the inverted input of AND function gate 610. This gate then enables clock circuit A as the master clock circuit by gating clock signals from clock circuit A to processing unit 500 and the remainder of the switching system via OR gate 650 and the CLK-OUT lead.

The logic level 0 $\overline{\text{DISABLE}}$ signals appearing at multivibrators 210, 310 and 410 force these multivibrators to time-out and apply logic level 0 signals to the reset (R) inputs of latches 220, 320 and 420, respectively. Consequently, these latches reset, since the outputs of their associated delay circuits are at a logic level 1, and provide logic level 1 signals at their outputs. Therefore AND function gates 620, 630 and 640 prevent clock circuits B, C and D, respectively, from becoming master clock circuits because they prevent clock signals from these clock circuits from being gated to OR gate 650. Since initialization is now complete, processing unit 500 next removes these ENABLE and $\overline{\text{DISABLE}}$ signals by applying a logic level 0 signal to leads ENB1-4 and logic level 1 signals to leads DSB1-4.

Since the clock selection circuit is selecting clock circuit A, the output of latch 120 will be at a logic level 0 and the outputs of latches 220, 320 and 420 will be at a logic level 1. The logic level 0 signal from latch 120 causes gates 240, 340 and 440 to provide a logic level 0 signal because the ENABLE signals from the processing unit are at logic level 0. The logic level 0 signals from OR gates 240, 340 and 440 cause AND gates 270, 370 and 470, to apply logic level 0 signals on the LOAD input of programmable delay circuits 230, 330 and 430, respectively. These LOAD input signals cause program delay circuits 230, 330 and 430 to be inactive, i.e., at a logic level 1.

Monostable multivibrators 110, 210, 310 and 410 generate a 200 nanosecond timing pulse. However, since they are retriggerable, this 200 nanosecond pulse begins every time a pulse appears at its input. Clock circuits A, B, C and D typically operate at a 12,352 MHz rate, which results in an 81 nanosecond period. Consequently, the 200 nanosecond monostable pulse is retriggered every 81 nanoseconds and thus generate a logic level 1 signal as long as the clock pulses continue to appear more frequently than the timing period of the associated multivibrator. If a clock circuit fails, the clock pulses disappear and the associated retriggerable multivibrator times out after 200 nanoseconds. This results in a logic level 0 signal being applied to the reset (R) input of the associated latch.

In the event of a failure of clock circuit A, the clock selection circuit selects the next properly operating clock circuit in the clock selection sequence. Clock circuit C is the next clock circuit to be selected according to the prioritized sequncy if clock circuit C is operating properly.

When clock circuit A fails, retriggerable monostable multivibrator 110 generates a logic level 0 signal which causes latch 120 to reset, since the output of program delay circuit 130 is at a logic level 1, thereby providing a logic level 1 signal at its output. At this moment, latches 220, 320 and 420 are also in the reset state and no clock circuit is selected. Therefore gates 140, 150, 160, 240, 250, 260, 340, 350, 360, 440, 450 and 460 all have a logic level 1 signal at their inputs and thus their outputs are at logic level 1. Consequently, gates 170, 270, 370 and 470 all apply a logic level 1 signal to the LOAD input of program delay elements 130, 230, 330 and 430. In response to this input, the program delay elements are activated and start timing out. Since clock circuit A has failed, no clock signal is applied to the CLOCK input of program delay circuit 130. Consequently, this program delay circuit is inactive and latch 120 cannot be set.

At this moment then, all program delay circuits with proper CLOCK inputs are active and timing out. Program delay circuit 130 has the shortest delay and would time out first except that its CLOCK input is dead.

Program delay circuit 330 times out next and set latch 320, selecting clock circuit C, if this clock circuit is properly operating. If it isn't operating properly, program delay circuit 330 doesn't time out and retriggerable monostable multivibrator 310 holds latch 320 reset. Once latch 320 is set, its output goes to a logic level 0 and enables clock circuit C as the master clock circuit. Consequently, OR gates 150, 250 and 460 receive a logic level 0 signal. Since the ENABLE signals are also at a logic level 0, these gates apply a logic level 0 signal to AND gates 170, 270 and 470, respectively. These gates then provide logic level 0 signals and program delay elements 130, 230 and 430 stop timing, thus preventing clock circuits A, B and D from being enabled as master clock circuits. Thus, because of the difference in the delay times of program delay circuits 130, 230, 330 and 430, the first one to time out prevents any of the other program delay circuits from timing out.

When clock circuit A fails, clock circuit C is normally selected. However, if clock circuit C is not operational, then clock circuit B would be selected, since program delay circuit 330, associated with clock circuit C, would be inoperative and multivibrator 310 would also have timed out. If clock circuit B is also inoperative, the clock circuit D would be selected. In this prioritized selection scheme, if clock circuit B, C, or D had been selected and subsequently failed, clock circuit A would be selected, assuming it is operational, since it would have the highest priority.

Figure 2:
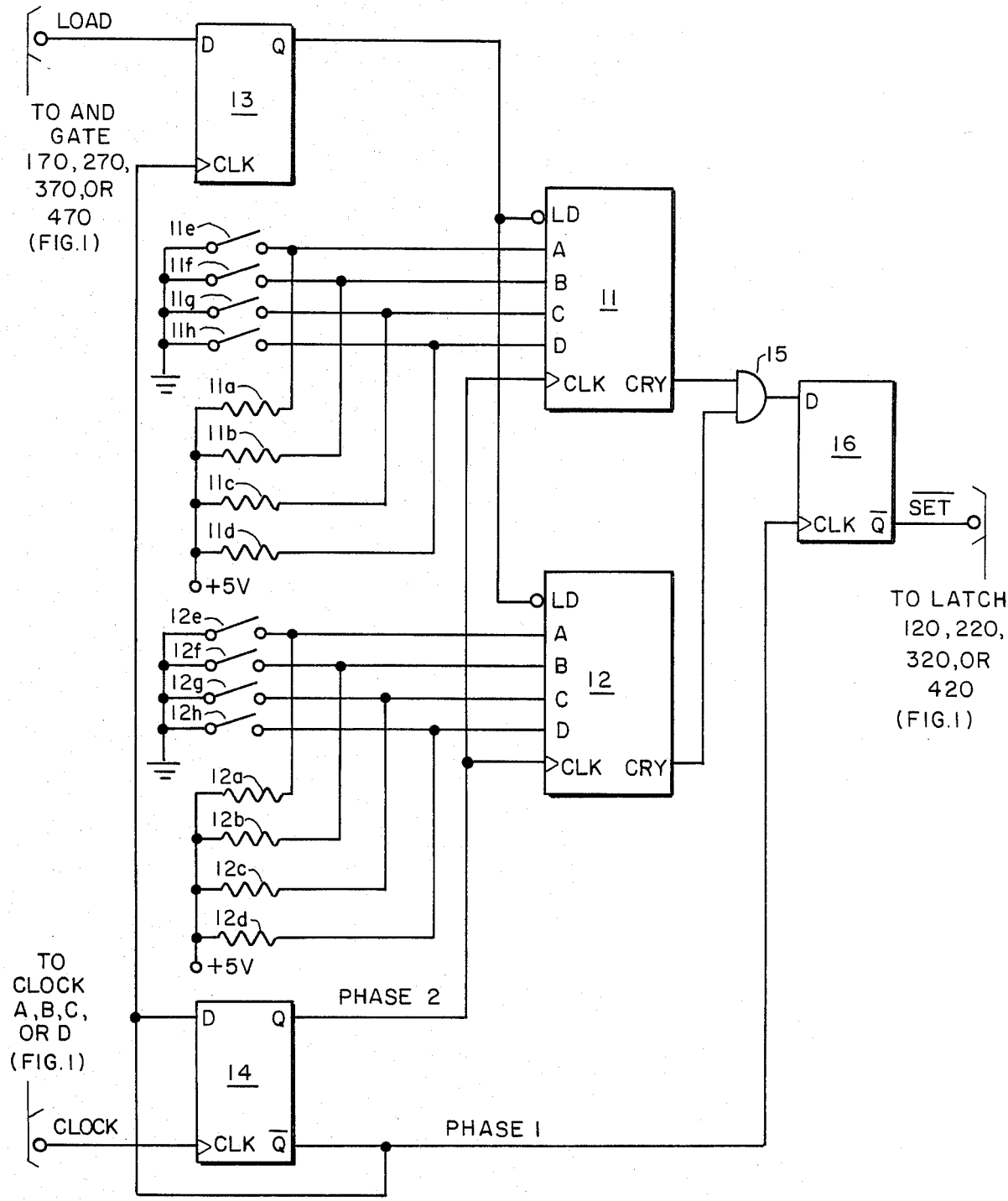
FIG. 2 is a combined block, logic and schematic diagram of the program delay circuit shown in FIG. 1.

Referring now to FIG. 2, the program delay circuit of the clock selection circuit is shown. The program delay circuit includes two programmable up counters 11 and 12, whose load (LD) inputs are connected to each other and to the Q output of the load flip-flop 13. The clock (CLK) inputs of these counters are connected to each other and to the Q output of clock flip-flop 14. The carry (CRY) output of these counters are connected to the inputs of AND gate 15 and the output of this gate is connected to the D input of set flip-flop 16. Program inputs A, B, C and D, of counter 11 are individually connected to a +5 volt source through resistors 11a, b, c and d, respectively, and to ground through switches 11e, f, g and h, respectively. Similarly program inputs A, B, C and D of counter 12 are individually connected to a +5 volt source through resistors 12a, b, c and d, respectively, and to ground through switches 12e, f, g and h, respectively.

The D input of load flip-flop 13 is connected to an associated AND gate 170, 270, 370 or 470 and the clock (CLK) input of load flip-flop 13 is connected to the $\overline{Q}$ output of clock flip-flop 14. The clock input of the clock flip-flop 14 is connected to an associated clock circuit A, B, C or D and the D input of clock flip-flop 14 if connected to its own $\overline{Q}$ output. The $\overline{Q}$ output of the clock flip-flop is also connected to the clock (CLK) input of set flip-flop 16. The $\overline{Q}$ output of set flip-flop 16 is connected to an associated latch 120, 220, 320 or 420.

The program delay circuit receives two input signals, LOAD and CLOCK, and it provides a $\overline{SET}$ output signal. The LOAD signal is initially at a logic level 0 and the CLOCK signal alternates symetrically between logic level 0 and logic level 1 at a frequency of 12.352 MHz. As a result of these input signals, the SET output signal remains at a logic level 1 indefinitely. If the LOAD signal changes to a logic level 1, but returns to a logic level 0 before the total delay time of the program delay circuit has elapsed, then the SET output signal is unaffected and remains at a logic level 1. However, if the LOAD signal changes to a logic level 1 and stays at a logic level 1 for the total programmed delay time of the program delay circuit, then, after this delay time, the SET output signal changes to a logic level 0 for two periods of the CLOCK signal. It then returns to a logic level 1.

Clock flip-flop 14 divides the CLOCK input signal frequency by two (multiplies the period by 2) and outputs two phases of this lower frequency signal that are 180 degrees out of the phase. The $\overline{Q}$ output provides a PHASE 1 signal and the Q output provides a PHASE 2 signal. When the LOAD signal is at a logic level 0, the PHASE 1 signal clock flip-flop 13 and causes it to provide a logic level 0 signal at its Q output. The load (LD) input of counters 11 and 12 are therefore held at a logic level 0. These counters are clocked by the PHASE 2 signal, but as long as their load inputs are at a logic level 0, they remain in a loaded state. The carry outputs of these counters then remain at a logic level 0 and therefore AND gate 35 applies a logic level 0 signal to the D input of set flip-flop 16. Since this flip-flop is clocked by the PHASE 1 signal, it provides a logic level 1 signal at its $\overline{Q}$ output.

The LOAD signal changes to a logic level 1 to initiate the timing sequence of the program delay circuit. On the next rising edge of the PHASE 1 signal, the Q output of load flip-flop 13 changes to a logic level 1. The load inputs of counters 11 and 12 are therefore at a logic level 1 and on the next rising edge of the PHASE 2 signal each of these counters counts up by one count from the number they were loaded with.

The binary number that the counters are loaded with is determined by switches 11e, f, g and h and 12e, f, g and h, and by resistors 11a, b, c and d and 12a, b, c and d. If switch 11e is open then resistor 11a pulls up input A of counter 11 to a logic level 1. If switch 11e is closed, then input A of counter 11 is grounded and therefore at a logic level 0. The same principle applies for all data inputs A, B, C and D of both counters 11 and 12.

These counters are programmed (loaded) with the same binary number. Therefore, the PHASE 2 signal causes them to count up in synchromism starting at the same binary number. As long as the load input to counters 11 and 12 remains at a logic level 1, these counters count up once on every rising edge of the PHASE 2 signal. When counters 11 and 12 reach their maximum count, they simultaneously provide a logic level 1 carry (CRY) output signal. These signals cause AND gate 15 to provide a logic level 1 signal which causes set flip-flop 16 to provide a logic level 0 signal on the next rising edge of the PHASE 1 signal.

On the next rising edge of the PHASE 2 signal, counters 11 and 12 count from their largest number to their smallest number and the carry output signals return to a logic level 0. Therefore AND gate 15 provides a logic level 0 signal and on the next rising edge of the PHASE 1 signal, the $\overline{Q}$ output of set flip-flop 16 returns to a logic level 1. As long as the LOAD input signal to the program delay circuit remains at a logic level 1, counters 11 and 12 continue counting from 0 to their maximum number of 15, and providing a carry signal which causes set flip-flop 16 to provide a logic level 0 $\overline{SET}$ pulse on its $\overline{Q}$ output. However, soon after the LOAD input signal goes to a logic level 0, counters 11 and 12 stop counting and reload.

The total delay of this program delay circuit is from the time that the LOAD signal goes to a logic level 1 until the $\overline{SET}$ signal goes to a logic level 0. This time includes the time from when the LOAD input changes to a logic 1 until the first rising edge of the PHASE 1 signal (less than one period of the PHASE 1 signal), plus the time it takes for counters 11 and 12 to count from their loaded number to their maximum number. This counting time delay equals number of counts to the maximum number times the period of the PHASE 2 signal. This delay can be expressed as:

$$C*P < delay < (1+C)*P,$$

where C is the number of counts from load to maximum, and P is the period of the PHASE 1 or PHASE 2 signals. This period is equal to twice the period of the CLOCK signal, i.e. P=81×2=162 nanoseconds. In this embodiment, program delay circuit 130 (FIG. 1) has C=1 so its delay is expressed as (162<delay<324) nanoseconds. Circuit 330 has C=4 so its delay is expressed as (648<delay<810) nanoseconds. Circuit 230 has C=7 so its delay is expressed as (1134<delay<1296) nanoseconds. Similarly, circuit 430 has C=10 so its delay is expressed as (1620<delay<1782) nanoseconds. To program these counts (C) the following switch settings are used for circuit 130, switch e is closed and the others are open for circuit 330, switch g closed and the others are open for circuit 230, switches e, f and g closed and switch h is open and for circuit 430, switches f and h are closed and the others open.

The purpose of the two synchronous counters is to detect a failure of either counter or of the counter programming. If either counter fails to count properly, the carry output signals from counters 11 and 12 are not likely to coincide and thus the AND gate 15 will not get two simultaneous logic 1 inputs. Consequently the $\overline{SET}$ output signal will not go active, i.e., logic level 0 also, if either counter is programmed to the wrong number (count C incorrect), the carry output signals from counters 11 and 12 will not coincide and the $\overline{SET}$ signal will not go active. If one of these situations occur, the carry output signals of counters 11 and 12 might momentarily overlap even though one counter was counting differently from the other. Set flip-flop 16 prevents these glitches from propagating to the SET output.

The clock selection circuit of the present invention thus selects and enables one of a plurality of clock circuits in response to initialization by a processing unit or detection of failure of an on-line clock circuit. The clock circuits are selected on the basis of a priority arrangement. The clock circuit failure is detected by a retriggerable monostable multivibrator and the selection priority is based on time delays generated by programmed counters associated with each clock circuit.

It will be obvious to those skilled in the art that numerous modifications of the present invention can be made without departing from the spirit of the invention which shall be limited only by the scope of the claims appended hereto.

What is claimed is:

1. A clock selection circuit for use in a switching system which includes a plurality of clock circuits, each being operative to provide a stream of clock pulses, said clock selection circuit comprising:

a plurality of delay circuits each connected to all but one associated clock circuit and each being operative to provide a time-out signal;

a plurality of clock pulse detection circuits, each connected to said associated clock circuit and operative, in response to an absence of a clock pulse for a predetermined time, to provide a clock failure signal;

a plurality of storage circuits each connected to a different one of said delay circuits and a different one of said detection circuits, and each being operative in response to the time-out signal from the connected delay circuit to provide a clock enable signal for said associated clock circuit, and each of said storage circuits being further operative in response to the clock failure signal from the connected clock pulse detection circuit to provide a clock disable signal for said associated clock circuit; and a clock signal gating circuit connected to said plurality of clock circuits and said plurality of storage circuits and operative in response to each of said clock enable signal to gate clock pulses from the associated clock circuit to said switching system;

each of said delay circuits being operative in response to simultaneous presence of said clock disable signal from all of the unassociated clock circuits to provide said time-out signal after a different predetermined time.

2. A clock selection circuit as claimed in claim 1, wherein said switching system includes a processing unit which is operative to provide a plurality of delay enable signals, each of said delay circuit being further connected to said processing unit and being operative in response to an associated one of said delay enable signals to provide said time-out signal after said different predetermined time.

3. A clock selection circuit as claimed in claim 1, wherein said switching system includes a processing unit which is operative to provide a plurality of detector disable signals, each of said clock pulse detection circuits being further connected to said processing unit and being operative in response to as associated one of said detector disable signals to provide said clock failure signal.

4. A clock selection circuit as claimed in claim 1, wherein each of said clock pulse detection circuits comprises a timing circuit.

5. A clock selection circuit as claimed in claim 4, wherein said timing circuit comprises a retriggerable monostable multivibrator.

6. A clock selection circuit as claimed in claim 1, wherein each of said storage circuits comprises a latch circuit.

7. A clock selection circuit as claimed in claim 1, wherein said clock signal gating circuit comprises a plurality of AND function gates each connected to a different storage circuit and the clock circuit associated therewith, each of said AND function gates being operative in response to the clock enable signal from said connected storage circuit and said stream of clock pulses from the associated clock circuit to provide a gated stream of clock pulses; and an OR function gate connected to said plurality of AND function gates and operative in response to anyone of said gated streams of clock pulses to gate clock pulses from said gated stream to said switching system.

8. A clock selection circuit as claimed in claim 1, wherein there is further included: a plurality of control signal gating circuits and connected between a different one of said delay circuits and all of said unassociated storage circuits, and each being operative in response to simultaneous clock disable signals from all of the unassociated storage circuits to provide a load signal; and said connected delay circuit being operative in response to said load signal to provide said time-out signal after said predetermined time.

9. A clock selection circuit as claimed in claim 2, wherein there is further included: a plurality of control signal gating circuits each connected between a different one of said delay circuits and said processing unit, and each being operative in response to a different one of said delay enable signals to provide a load signal; and said connected delay circuit being operative in response to said load signal to provide said time-out signal after said predetermined time.

10. A clock selection circuit as claimed in claim 8, wherein said control signal gating circuit comprises a plurality of OR function gates, each connected to a different one of said unassociated storage circuits and each operative in response to the clock disable signal from the connected storage circuit to provide a gated clock disable signal; and an AND function gate connected to said plurality of OR function gates and being operative in response to simultaneous gated clock disable signals from all of said OR function gates to provide said load signal.

11. A clock selection circuit as claimed in claim 9 wherein each of said control signal gating circuits are further connected to all of said unassociated storage circuits, and each being further operative in response to the clock disable signal from all of the unassociated clock circuits to provide said load signal.

12. A clock selection circuit as claimed in claim 11, wherein said control signal gating circuit comprises a plurality of OR function gates, each connected to a different one of said unassociated storage circuits and further connected to said processing unit and each being operative in response to the clock disable signal from the connected storage circuit or said different one of said delay enable signals to provide a gated control signal; and an AND function gate connected to said plurality of OR function gates and being operative in response to simultaneous gated control signals from all of said OR function gates to provide said load signal.

13. A clock selection circuit as claimed in claim 1, wherein said delay circuit comprises:
control signal gating means connected to all of said unassociated storage circuits and being operative in response to simultaneous clock disable signals from all of the unassociated storage circuits to provide a load signal;
clock pulsing means connected to said control signal gating means and the associated clock circuit and operative in response to said clock pulse stream to provide a counter clock pulse stream and a register clock pulse stream;
load signal gating means connected to said control signal gating means and said clock pulsing means and operative in response to said load signal and a register clock pulse to provide a gated load signal; and being further operative in response to a register clock pulse signal and an absence of said load signal to inhibit said gated load signal;
counting means connected to said load signal gating means and said clock pulsing means and operative to be loaded to a predetermined count in response to a counter clock pulse and an absence of said gated load signal; and further operative in response to said gated load signal and said counter clock pulse stream to count said counter clock pulses and provide a carry signal upon reaching a predetermined count; and
output storage means connected to said counting means and said clock pulsing means and operative in response to said carry signal and a register clock pulse to provide said time-out signal.

14. A clock selection circuit as claimed in claim 13, wherein said clock pulsing means comprises a first D-type flip-flop having first and second outputs, a data input connected to said first output and a clock input connected to said associated clock circuit.

15. A clock selection circuit as claimed in claim 14, wherein said load signal gating means comprises a second D-type flip-flop having an output, a data input connected to said control signal gating circuit, and a clock input connected to said first output of said clock pulsing means.

16. A clock selection circuit as claimed in claim 15, wherein said counting means comprises:
a source of logic level 1 signals, a source of logic level 0 signals, a plurality of switches each connectable to either source;
first and second counters each having an output, a load input connected to the output of said second D-type flip-flop, and a clock input connected to the second output of said first D-type flip-flop, and a plurality of data inputs each connectable to either source of signals by an associated one of said switches;
each of said first and second counters being operative in response to an absence of said gated load signal to be loaded to said same predetermined count which corresponds to the same predetermined arrangement of said switching;
each further being operative in response to said gated load signal to count said counter clock pulses and provide first and second internal carry signal, respectively; and a carry signal AND function gate connected to said first and second counters and operative in response to simultaneously occurring first and second internal carry signals to provide said carry signal.

17. A clock selection circuit as claimed in claim 12, wherein said delay circuit comprises:
clock pulsing means connected to said control signal gating means and the associated clock circuit and operative in response to said clock pulse stream to provide a counter clock pulse stream and a register clock pulse stream;
load signal gating means connected to said control signal gating means and said clock pulsing means and operative in response to said load signal and a register clock pulse to provide a gated load signal; and being further operative in response to a register clock pulse signal and an absence of said load signal to inhibit said gated load signal;
counting means connected to said load signal gating means and said clock pulsing means and operative to be loaded to a predetermined count in response to a counter clock pulse and an absence of said gated load signal; and further operative in response to said gated load signal and said counter clock pulse stream to count said counter clock pulses and provide a carry signal upon reaching a predetermined count; and
output storage means connected to said counting means and said clock pulsing means and operative in response to said carry signal and a register clock pulse to provide said time-out signal.

18. A clock selection circuit as claimed in claim 17, wherein said clock pulsing means comprises a first D-type flip-flop having first and second outputs, a data input connected to said first output and a clock input connected to said associated clock circuit.

19. A clock selection circuit as claimed in claim 15, wherein said load signal gating means comprises a second D-type flip-flop having an output, a data input connected to said control signal gating circuit, and a clock input connected to said first output of said clock pulsing means.

20. A clock selection circuit as claimed in claim 19, wherein said counting means comprises:
a source of logic level 1 signals, a source of logic level 0 signals, a plurality of switches each connectable to either source; and
first and second counters each having an output, a load input connected to the output of said second D-type flip-flop, and a clock input connected to the second output of said first D-type flip-flop, and a plurality of data inputs each connectable to either source of signals by an associated one of said switches;
each of said first and second counters being operative in response to an absence of said gated load signal to be loaded to said same predetermined count which corresponds to the same predetermined arrangement of said switches; each further being operative in response to said gated load signal to count said counter clock pulses and provide first and second internal carry signals, respectively; and
a carry signal AND function gate connected to said first and second counters and operative in response to simultaneously occurring first and second internal carry signals to provide said carry signal.

* * * * *